US008652980B2

(12) United States Patent
Zoitos et al.

(10) Patent No.: US 8,652,980 B2
(45) Date of Patent: Feb. 18, 2014

(54) INORGANIC FIBER

(75) Inventors: Bruce Kendall Zoitos, Williamsville, NY (US); Michael Joseph Andrejcak, Amherst, NY (US)

(73) Assignee: Unifax I LLC, Tonawanda, NY (US)

( * ) Notice: Subject to any disclaimer, the term of this patent is extended or adjusted under 35 U.S.C. 154(b) by 136 days.

(21) Appl. No.: 13/298,030

(22) Filed: Nov. 16, 2011

(65) Prior Publication Data
US 2012/0119133 A1   May 17, 2012

Related U.S. Application Data

(60) Provisional application No. 61/414,143, filed on Nov. 16, 2010.

(51) Int. Cl.
| C04B 35/00 | (2006.01) |
| C04B 35/057 | (2006.01) |
| C04B 35/10 | (2006.01) |
| C03C 13/00 | (2006.01) |

(52) U.S. Cl.
USPC ............. 501/95.1; 501/123; 501/125; 501/35

(58) Field of Classification Search
USPC ............ 501/35, 36, 41, 52, 73, 77, 95.1, 123, 501/125; 65/454, 469
See application file for complete search history.

(56) References Cited

U.S. PATENT DOCUMENTS

| 2,576,312 A | 11/1951 | Minnick |
| 2,693,668 A | 11/1954 | Slayter |
| 2,710,261 A | 6/1955 | McMullen |
| 2,876,120 A | 3/1959 | Machlan |
| 2,877,124 A | 3/1959 | Welsh |
| 3,166,428 A | 1/1965 | Thomas |
| 3,469,729 A | 9/1969 | Grekila et al. |
| 3,597,179 A | 8/1971 | Simmons |
| 3,687,850 A | 8/1972 | Gagin |
| 3,783,092 A | 1/1974 | Majumdar |
| 3,900,329 A | 8/1975 | Grubb et al. |
| 3,985,935 A | 10/1976 | Brodmann |
| 4,104,355 A | 8/1978 | Dunn et al. |
| 4,118,239 A | 10/1978 | Gagin et al. |
| 4,345,430 A | 8/1982 | Pallo et al. |
| 4,461,840 A | 7/1984 | Massol |
| 4,604,097 A | 8/1986 | Graves |
| 4,613,577 A | 9/1986 | Tagai et al. |
| 4,615,988 A | 10/1986 | Le Moigne et al. |
| 4,735,857 A | 4/1988 | Tagai et al. |
| 4,820,573 A | 4/1989 | Tagai et al. |
| 4,830,989 A | 5/1989 | Trivedi et al. |
| 4,867,779 A | 9/1989 | Meunier et al. |
| 5,037,470 A | 8/1991 | Matzen et al. |
| 5,055,428 A | 10/1991 | Porter |
| 5,108,957 A | 4/1992 | Cohen et al. |
| 5,250,488 A | 10/1993 | Thelohan et al. |
| 5,284,807 A | 2/1994 | Komori et al. |
| 5,312,806 A | 5/1994 | Mogensen |
| 5,332,699 A | 7/1994 | Olds et al. |
| 5,346,868 A | 9/1994 | Eschner |
| 5,420,087 A | 5/1995 | Wieland et al. |
| 5,552,213 A | 9/1996 | Eschner |
| 5,576,252 A | 11/1996 | Rapp et al. |
| 5,583,080 A | 12/1996 | Guldberg et al. |
| 5,603,887 A | 2/1997 | Eschner |
| RE35,557 E | 7/1997 | Thelohan et al. |
| 5,714,421 A | 2/1998 | Olds et al. |
| 5,811,360 A | 9/1998 | Jubb |
| 5,843,854 A | 12/1998 | Karppinen et al. |
| 5,932,500 A | 8/1999 | Jensen et al. |
| 5,935,886 A | 8/1999 | Jensen et al. |
| 5,955,389 A | 9/1999 | Jubb |
| 5,962,354 A | 10/1999 | Fyles et al. |
| 5,968,648 A | 10/1999 | Rapp et al. |
| 5,994,247 A | 11/1999 | Jubb et al. |
| 5,998,315 A | 12/1999 | Jubb |
| 6,043,170 A | 3/2000 | Steinkopf et al. |
| 6,156,683 A | 12/2000 | Grove-Rasmussen et al. |
| 6,180,546 B1 | 1/2001 | Jubb et al. |
| 6,284,684 B1 | 9/2001 | Vignesoult et al. |
| 6,313,050 B1 | 11/2001 | De Merigno et al. |
| 6,346,494 B1 | 2/2002 | Jensen et al. |

(Continued)

FOREIGN PATENT DOCUMENTS

| CA | 1 271 785 | 7/1990 |
| CA | 2 017 344 | 11/1990 |
| CA | 2043699 | 12/1991 |
| EP | 0 186 128 | 7/1986 |
| EP | 0 586 797 | 3/1994 |
| EP | 1 323 687 | 7/2003 |
| EP | 1 868 954 | 12/2007 |
| EP | 1 908 737 A1 | 4/2008 |
| FR | 2662687 | 12/1991 |
| FR | 2 778 401 | 11/1999 |

(Continued)

OTHER PUBLICATIONS

International Search Report, Form PCT/ISA/210, Mailed Jun. 29, 2012, for corresponding PCT International Patent Application No. PCT/US2011/061020.
Written Opinion, Form PCT/ISA/237, mailed Jun. 29, 2012, for corresponding PCT International Patent Application No. PCT/US2011/061020.
Wallenburger et al. "Inviscid melt spinning: As-spun crystalline alumina fibers", J. Mater. Res., vol. 5, No. 11, Nov. 1990.

(Continued)

*Primary Examiner* — Karl Group
*Assistant Examiner* — Elizabeth A Bolden
(74) *Attorney, Agent, or Firm* — Curatolo Sidoti Co., LPA; Joseph G. Curatolo; Salvatore A. Sidoti

(57) ABSTRACT

Inorganic fibers including calcia, alumina, potassia and optionally sodia as the major fiber components are provided. Also provided are methods of preparing the inorganic fibers and of thermally insulating articles using thermal insulation comprising the inorganic fibers. The inorganic fibers are soluble in physiological saline solutions, do not form crystalline silica, and are resistant to temperatures of 1260° C. and greater.

36 Claims, 5 Drawing Sheets

(56) References Cited

U.S. PATENT DOCUMENTS

| | | |
|---|---|---|
| 6,358,872 B1 | 3/2002 | Karppinen et al. |
| 6,458,436 B1 | 10/2002 | Hansen et al. |
| 6,897,173 B2 | 5/2005 | Bernard et al. |
| 6,953,757 B2 | 10/2005 | Zoitos et al. |
| 7,153,796 B2 | 12/2006 | Jubb et al. |
| 7,259,118 B2 | 8/2007 | Jubb et al. |
| 7,468,337 B2 | 12/2008 | Zoitos et al. |
| 7,470,641 B2 | 12/2008 | Jubb et al. |
| 7,638,447 B2 | 12/2009 | Bernard et al. |
| 7,651,965 B2 | 1/2010 | Jubb et al. |
| 7,704,902 B2 | 4/2010 | Maquin et al. |
| 7,709,027 B2 | 5/2010 | Fechner et al. |
| 7,803,729 B2 | 9/2010 | Keller et al. |
| 7,887,917 B2 * | 2/2011 | Zoitos et al. ................. 428/392 |
| 2002/0032116 A1 | 3/2002 | Jubb et al. |
| 2003/0015003 A1 | 1/2003 | Fisler et al. |
| 2005/0079970 A1 | 4/2005 | Otaki et al. |
| 2005/0085369 A1 | 4/2005 | Jensen |
| 2005/0268656 A1 | 12/2005 | Raichel et al. |
| 2006/0211562 A1 | 9/2006 | Fisler et al. |
| 2007/0020454 A1 * | 1/2007 | Zoitos et al. ................. 428/378 |
| 2008/0191179 A1 | 8/2008 | Bernard et al. |
| 2009/0130937 A1 | 5/2009 | Wainwright et al. |
| 2010/0184581 A1 | 7/2010 | Berthereau et al. |

FOREIGN PATENT DOCUMENTS

| | | |
|---|---|---|
| GB | 520247 | 4/1940 |
| GB | 1360199 | 7/1974 |
| GB | 1360200 | 7/1974 |
| GB | 2 383 793 | 7/2003 |
| KR | 10-2004-0013846 A | 2/2004 |
| KR | 10-2010-0084917 A | 7/2010 |
| WO | WO85/02393 | 6/1985 |
| WO | WO85/02394 | 6/1985 |
| WO | WO87/05007 | 8/1987 |
| WO | WO89/12032 | 12/1989 |
| WO | WO90/02713 | 3/1990 |
| WO | WO92/09536 | 6/1992 |
| WO | WO93/15028 | 8/1993 |
| WO | WO94/15883 | 7/1994 |
| WO | WO/03/050054 | 6/2003 |
| WO | WO 03/060016 A1 | 7/2003 |
| WO | WO2005-035895 | 4/2005 |
| WO | WO2006-103375 | 10/2006 |
| WO | WO2007-054697 | 5/2007 |

OTHER PUBLICATIONS

Knudsen, et al. Technical Report In-virto dissoultion rate of mineral fibres at pH 4.5 and 7.4—A new mathematical tool to evaluate the dependency on composition, Glass Sci. Technol. 78 (2005) No. 3, pp. 132-138.

International Preliminary Report on Patenability, Form PCT/IB/373, mailed May 21, 2013, for corresponding PCT International Patent Application PCT/US2011/061020.

* cited by examiner

INORGANIC FIBER

CROSS REFERENCE TO RELATED APPLICATIONS

This application claims the benefit of the filing date under 35 U.S.C. §119(e) of U.S. Provisional Application No. 61/414,143 filed Nov. 16, 2010, which is hereby incorporated by reference.

TECHNICAL FIELD

A high temperature resistant inorganic fiber that is useful as a thermal, electrical, or acoustical insulating material, and which has a use temperature of 1260° C. and greater is provided. The high temperature resistant inorganic fiber is easily manufacturable, exhibits low shrinkage after prolonged exposure to the use temperature, retains good mechanical strength after exposure to the use temperature and is soluble in physiological fluids.

BACKGROUND

The insulation material industry has determined that it is desirable to utilize fibers in thermal and acoustical insulating applications, which are not durable in physiological fluids, that is, fiber compositions which exhibit a low biopersistence. While candidate materials have been proposed, the use temperature limit of these materials have not been high enough to accommodate many of the applications to which high temperature resistant fibers, including vitreous fibers and ceramic fibers, are applied. Many compositions within the vitreous fiber family of materials have been proposed which are non-durable or decomposable in a physiological medium.

The high temperature resistant fibers should also exhibit minimal linear shrinkage at expected exposure temperatures, and after prolonged or continuous exposure to the expected use temperatures, in order to provide effective thermal protection to the article being insulated.

In addition to temperature resistance as expressed by shrinkage characteristics that are important in fibers that are used in insulation, it is also required that the fibers have mechanical strength characteristics during and following exposure to the use or service temperature, that will permit the fiber to maintain its structural integrity and insulating characteristics in use.

One characteristic of the mechanical integrity of a fiber is its after service friability. The more friable a fiber, that is, the more easily it is crushed or crumbled to a powder, the less mechanical integrity it possesses. In general, inorganic fibers that exhibit both high temperature resistance and non-durability in physiological fluids also exhibit a relatively high degree of after service friability. This results in the fiber lacking the strength or mechanical integrity after exposure to the service temperature, to be able to provide the necessary structure to accomplish its insulating purpose.

Thus, it is still desirable to produce an improved inorganic fiber composition that is readily manufacturable from a fiberizable melt of desired ingredients, which exhibits low shrinkage during and after exposure to service temperatures of 1100° C. or greater, which exhibits low brittleness after exposure to the expected use temperatures, and which maintains mechanical integrity after exposure to use temperatures of 1100° C. or greater.

DESCRIPTION

Figure 1:
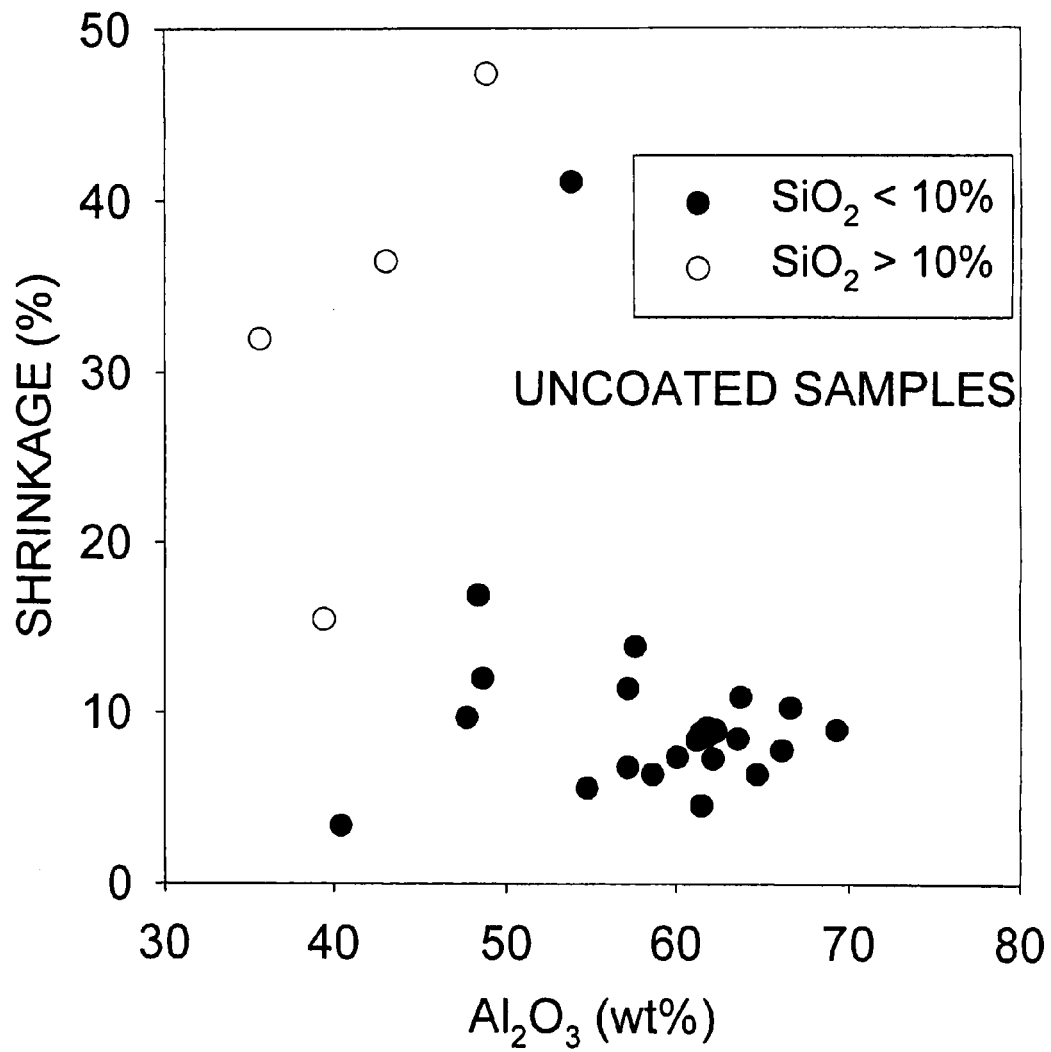
FIG. 1 is a graph showing the percent shrinkage of calcia, alumina, alkali metal oxide fibers in relation to varying amounts of silica and alumina.

Disclosed is a high temperature resistant inorganic fiber useful as a thermal, electrical, or acoustical insulating material. The high temperature resistant inorganic fiber is easily manufacturable, exhibits low shrinkage after prolonged exposure to the use temperature, retains good mechanical strength after exposure to the use temperature, and is soluble (i.e., non-biopersistent) in physiological fluids.

The inorganic fiber has a use temperature of 1260° C. and greater. The high temperature resistant inorganic fiber is soluble in simulated physiological fluids, such as simulated lung fluid and does not form crystalline silica.

The inorganic fiber comprises the fiberization product of calcia, alumina, and potassia. According to certain illustrative embodiments, the inorganic fiber comprises the fiberization product of calcia, alumina, potassia, and sodia.

Also provided is a process for the making of an inorganic fiber, the process comprises forming a melt with ingredients comprising calcia, alumina, and potassia, and producing fibers from the melt.

According to certain embodiments, the process for the making of an inorganic fiber comprises forming a melt with ingredients comprising calcia, alumina, potassia, and sodia, and producing fibers from the melt.

A thermally insulating material or article is additionally provided. The thermally insulating material or article comprises a plurality of the inorganic fibers comprising the fiberization product of calcia, alumina, and potassia.

According to certain illustrative embodiments, the thermally insulating material or article comprises a plurality of the inorganic fibers comprising the fiberization product of calcia, alumina, potassia and sodia.

A method of insulating an article is further provided. The method of thermally insulating an article comprises disposing on, in, near, or around the article to be insulated, a thermal insulation material or article comprising a plurality of inorganic fibers comprising a fiberization product of calcia, alumina, and potassia.

According to certain illustrative embodiment, the method of thermally insulating an article comprises disposing on, in, near, or around the article to be insulated, a thermal insulation material or article comprising a plurality of inorganic fibers comprising a fiberization product of calcia, alumina, potassia, and sodia.

Thermal insulation material prepared from the inorganic fibers are refractory in that they demonstrate a continuous service or use temperature of 1260° C. or greater.

The inorganic fiber is non-durable or non-biopersistent in physiological fluids. By "non-durable" or "non-biopersistent" in physiological fluids it is meant that the inorganic fiber at least partially dissolves or decomposes in such fluids, such as simulated lung fluid, during in vitro tests.

The durability test measures the rate at which mass is lost from the fiber (ng/cm²-hr) under conditions which simulate the temperature and chemical conditions found in the human lung. In particular, the fibers discussed here are highly soluble in Simulated Lung Fluid which has been acidified to pH 4.5. It is believed that this solution is representative of the acidic chemical environment within an alveolar macrophage. Thus, fibers with high acid-solubility may be broken down and removed from the lung via dissolution processes mediated by the macrophage. Prior fiber dissolution studies have discussed acid pH fiber dissolution testing [M. Guldberg, et al., "Measurement of In-Vitro Fibre Dissolution Rate at Acidic pH", Annals of Occupational Hygiene, V. 42, No. 4, pp 233-244, 1998].

To measure the dissolution rate of fibers in lung fluid acidified to pH 4.5, approximately 0.1 g of fiber is placed into a 50 ml centrifuge tube containing simulated lung fluid which has been warmed to 37° C. This is then placed into a shaking incubator for 6 hours and agitated at 100 cycles per minute. At the conclusion of the test, the tube is centrifuged and the solution is poured into a 60 ml syringe. The solution is then forced through a 0.45 μm filter to remove any particulate and tested for glass constituents using Inductively Coupled Plasma Spectroscopy analysis. This test may be conducted using either a near-neutral pH solution or an acidic solution. Although no specific dissolution rate standards exist, fibers with dissolution values in excess of 100 ng/cm2 hr are considered indicative of a non-biopersistent fiber.

The inorganic fibers are also tested for shrinkage at the anticipated use temperature. A mass of the inorganic fibers are formed into a suitable test pad. The length and width dimensions (typically 3×5 inches) of the test pad of inorganic fibers are measured by means of calipers. After measuring the length and width dimensions of the test pad, the pad is placed into a furnace. The temperature of the test furnace is ramped to the desired test temperature and is held substantially at this temperature for a fixed period of time. After heating the test pads in the test furnace at the desired temperature and for the desired fixed period of time, the test pads are removed from the test furnace and the length and width dimensions of the test pads are once again measured to determine any changes in dimension which have occurred in response to the heating in the test furnace.

According to certain illustrative embodiments, the inorganic fiber exhibits a linear shrinkage, as determined by the test method described above, of less than about 5 percent in response to exposure to a use temperature of 1260° C. for 24 hours.

The ability of the inorganic fibers to retain mechanical strength after exposure to a use temperature was evaluated by a compression recovery test. Compression recovery is a measure of the mechanical performance of an inorganic fiber in response to the exposure of the fiber to a desired use temperature for a given period of time. Compression recovery is measured by firing test pads manufactured from the inorganic fiber material to the test temperature for the selected period of time. The fired test pads are thereafter compressed to half of their original thickness and allowed to rebound. The amount of rebound is measured as percent recovery of the compressed thickness of the pad. Compression recovery was measured after exposure to a use temperature of 1260° C. for 24 hours. According to certain illustrative embodiments, the test pads manufactured from the inorganic fibers exhibit a compression recovery of at least 10 percent. According to other illustrative embodiments, the test pads manufactured from the inorganic fibers exhibit a compression recovery of about 10 to about 20 percent. According to further illustrative embodiments, the test pads manufactured from the inorganic fibers exhibit a compression recovery of about 11 to about 17 percent.

The inorganic fiber does not form crystalline silica. This aspect of the fiber is controlled by insuring that insufficient $SiO_2$ is present to allow crystalline silica to form. In the present case, the amount of $SiO_2$ is limited to less than 15% by weight, typically the amount of $SiO_2$ is less than 10% by weight. When the fiber is heated, any $SiO_2$ will typically form a crystalline product in combination with other fiber constituents (for example, mullite or wollasonite). So long as $SiO_2$ is not present in excess, no crystalline silica will form. The absence of crystalline silica in the present fibers was further confirmed by X-Ray Diffraction analysis of the heat-treated fibers, which indicates the absence of any form of crystalline silica.

Without limitation, and only by way of illustration, the alkali metal oxide included in the inorganic fiber may comprise potassia, sodia, or a mixture of potassia and sodia. According to certain embodiments, the fiberization product may comprises up to about 35 weight percent postassia or a combination of potassia and sodia. According to other embodiments, the fiberization product may comprises up to about 20 weight percent postassia or a combination of potassia and sodia.

According to certain illustrative embodiments, the high temperature resistant inorganic fiber comprises the fiberization product of a melt of raw materials comprising calcia, alumina, potassia, and boria.

According to certain illustrative embodiments, the high temperature resistant inorganic fiber comprises the fiberization product of a melt of raw materials comprising calcia, alumina, sodia, and boria.

According to certain illustrative embodiments, the high temperature resistant inorganic fiber comprises the fiberization product of a melt of raw materials comprising calcia, alumina, potassia, sodia, and boria.

According to certain illustrative embodiments, the inorganic fiber comprises the fiberization product of from about 10 weight percent to about 50 weight percent calcia, from about 50 weight percent to about 90 weight percent alumina, and potassia.

According to certain illustrative embodiments, the inorganic fiber comprises the fiberization product of from about 10 weight percent to about 50 weight percent calcia, from about 50 weight percent to about 90 weight percent alumina, and sodia.

According to certain illustrative embodiments, the inorganic fiber comprises the fiberization product of from about 10 weight percent to about 50 weight percent calcia, from about 50 weight percent to about 90 weight percent alumina, potassia, and sodia.

According to certain illustrative embodiments, the inorganic fiber comprises the fiberization product of from about 10 weight percent to about 50 weight percent calcia, from about 50 weight percent to about 90 weight percent alumina, and potassia, 15 weight percent or less by weight $SiO_2$.

According to certain illustrative embodiments, the inorganic fiber comprises the fiberization product of from about 10 weight percent to about 50 weight percent calcia, from about 50 weight percent to about 90 weight percent alumina, sodia, 15 weight percent or less by weight $SiO_2$.

According to certain illustrative embodiments, the inorganic fiber comprises the fiberization product of from about 10 weight percent to about 50 weight percent calcia, from about 50 weight percent to about 90 weight percent alumina, potassia and sodia, 15 weight percent or less by weight $SiO_2$.

According to certain illustrative embodiments, the inorganic fiber comprises the fiberization product of from about 10 weight percent to about 50 weight percent calcia, from about 50 weight percent to about 90 weight percent alumina, and potassia, 10 weight percent or less by weight $SiO_2$.

According to certain illustrative embodiments, the inorganic fiber comprises the fiberization product of from about 10 weight percent to about 50 weight percent calcia, from about 50 weight percent to about 90 weight percent alumina, sodia, 10 weight percent or less by weight $SiO_2$.

According to certain illustrative embodiments, the inorganic fiber comprises the fiberization product of from about 10 weight percent to about 50 weight percent calcia, from about 50 weight percent to about 90 weight percent alumina, potassia and sodia, 10 weight percent or less by weight $SiO_2$.

According to other illustrative embodiments, the inorganic fiber comprises the fiberization product of from about 20 weight percent to about 50 weight percent calcia, from about 50 weight percent to about 80 weight percent alumina, and potassia.

According to other illustrative embodiments, the inorganic fiber comprises the fiberization product of from about 20 weight percent to about 50 weight percent calcia, from about 50 weight percent to about 80 weight percent alumina, and sodia.

According to other illustrative embodiments, the inorganic fiber comprises the fiberization product of from about 20 weight percent to about 50 weight percent calcia, from about 50 weight percent to about 80 weight percent alumina, potassia and sodia.

According to other illustrative embodiments, the inorganic fiber comprises the fiberization product of from about 20 weight percent to about 50 weight percent calcia, from about 50 weight percent to about 80 weight percent alumina, and potassia, wherein the fiber contains 15 weight percent or less $SiO_2$.

According to other illustrative embodiments, the inorganic fiber comprises the fiberization product of from about 20 weight percent to about 50 weight percent calcia, from about 50 weight percent to about 80 weight percent alumina, sodia, wherein the fiber contains 10 weight percent or less $SiO_2$.

According to other illustrative embodiments, the inorganic fiber comprises the fiberization product of from about 20 weight percent to about 50 weight percent calcia, from about 50 weight percent to about 80 weight percent alumina, potassia and sodia, wherein the fiber contains 10 weight percent or less $SiO_2$.

According to other illustrative embodiments, the inorganic fiber comprises the fiberization product of from about 30 weight percent to about 50 weight percent calcia, from about 50 weight percent to about 70 weight percent alumina, and potassia.

According to other illustrative embodiments, the inorganic fiber comprises the fiberization product of from about 30 weight percent to about 50 weight percent calcia, from about 50 weight percent to about 70 weight percent alumina, and sodia.

According to other illustrative embodiments, the inorganic fiber comprises the fiberization product of from about 30 weight percent to about 50 weight percent calcia, from about 50 weight percent to about 70 weight percent alumina, potassia, and sodia.

According to other illustrative embodiments, the inorganic fiber comprises the fiberization product of from about 30 weight percent to about 50 weight percent calcia, from about 50 weight percent to about 70 weight percent alumina, and potassia, and wherein the fiber contains 15 weight percent or less $SiO_2$.

According to other illustrative embodiments, the inorganic fiber comprises the fiberization product of from about 30 weight percent to about 50 weight percent calcia, from about 50 weight percent to about 70 weight percent alumina, sodia, and wherein the fiber contains 10 weight percent or less $SiO_2$.

According to other illustrative embodiments, the inorganic fiber comprises the fiberization product of from about 30 weight percent to about 50 weight percent calcia, from about 50 weight percent to about 70 weight percent alumina, potassia, and sodia, and wherein the fiber contains 10 weight percent or less $SiO_2$.

According to other illustrative embodiments, the inorganic fiber comprises the fiberization product of from about 40 weight percent to about 50 weight percent calcia, from about 50 weight percent to about 60 weight percent alumina, and potassia.

According to other illustrative embodiments, the inorganic fiber comprises the fiberization product of from about 40 weight percent to about 50 weight percent calcia, from about 50 weight percent to about 60 weight percent alumina, and sodia.

According to other illustrative embodiments, the inorganic fiber comprises the fiberization product of from about 40 weight percent to about 50 weight percent calcia, from about 50 weight percent to about 60 weight percent alumina, potassia and sodia.

According to other illustrative embodiments, the inorganic fiber comprises the fiberization product of from about 40 weight percent to about 50 weight percent calcia, from about 50 weight percent to about 60 weight percent alumina, and potassia, wherein the fiber contains 15 weight percent or less $SiO_2$.

According to other illustrative embodiments, the inorganic fiber comprises the fiberization product of from about 40 weight percent to about 50 weight percent calcia, from about 50 weight percent to about 60 weight percent alumina, sodia, and wherein the fiber contains 10 weight percent or less $SiO_2$.

According to other illustrative embodiments, the inorganic fiber comprises the fiberization product of from about 40 weight percent to about 50 weight percent calcia, from about 50 weight percent to about 60 weight percent alumina, potassia and sodia, and wherein the fiber contains 10 weight percent or less $SiO_2$.

According to certain illustrative embodiments, the inorganic fiber comprises the fiberization product of about 10 weight percent to about 50 weight percent calcia, from about 60 weight percent to about 90 weight percent alumina, and up to about 20 weight percent of potassia.

According to certain illustrative embodiments, the inorganic fiber comprises the fiberization product of about 10 weight percent to about 50 weight percent calcia, from about 60 weight percent to about 90 weight percent alumina, and up to about 20 weight percent of sodia.

According to certain illustrative embodiments, the inorganic fiber comprises the fiberization product of about 10 weight percent to about 50 weight percent calcia, from about 60 weight percent to about 90 weight percent alumina, and up to about 20 weight percent of a combination of potassia and sodia.

According to certain illustrative embodiments, the inorganic fiber comprises the fiberization product of from about 10 weight percent to about 50 weight percent calcia, from about 60 weight percent to about 90 weight percent alumina, and up to 20 weight percent of potassia and sodia, and about 15 weight percent or less $SiO_2$.

According to certain illustrative embodiments, the inorganic fiber comprises the fiberization product of from about 10 weight percent to about 50 weight percent calcia, from about 60 weight percent to about 90 weight percent alumina, up to 20 weight percent of potassia and sodia, and about 10 weight percent or less $SiO_2$.

According to certain illustrative embodiments, the inorganic fiber comprises the fiberization product of from about 20 weight percent to about 35 weight percent calcia, from about 60 weight percent to about 70 weight percent alumina, from about 5 to about 10 weight percent potassia, and about 15 weight percent or less $SiO_2$.

According to certain illustrative embodiments, the inorganic fiber comprises the fiberization product of from about 20 weight percent to about 35 weight percent calcia, from about 60 weight percent to about 70 weight percent alumina, from about 5 to about 10 weight percent of sodia, and about 15 weight percent or less $SiO_2$.

According to certain illustrative embodiments, the inorganic fiber comprises the fiberization product of from about 20 weight percent to about 35 weight percent calcia, from about 60 weight percent to about 70 weight percent alumina, from about 5 to about 10 weight percent of a combination of potassia and sodia, and about 15 weight percent or less $SiO_2$.

According to certain illustrative embodiments, the inorganic fiber comprises the fiberization product of from about 20 weight percent to about 35 weight percent calcia, from about 60 weight percent to about 70 weight percent alumina, from about 5 to about 10 weight percent potassia, and about 10 weight percent or less $SiO_2$.

According to certain illustrative embodiments, the inorganic fiber comprises the fiberization product of from about 20 weight percent to about 35 weight percent calcia, from about 60 weight percent to about 70 weight percent alumina, from about 5 to about 10 weight percent of a combination of sodia, and about 10 weight percent or less $SiO_2$.

According to certain illustrative embodiments, the inorganic fiber comprises the fiberization product of from about 20 weight percent to about 35 weight percent calcia, from about 60 weight percent to about 70 weight percent alumina, from about 5 to about 10 weight percent of a combination of potassia and sodia, and about 10 weight percent or less $SiO_2$.

According to certain illustrative embodiments, a phosphorous pentoxide coating may be applied on the inorganic fiber at fiberization or on the surface of a inorganic fiber blanket.

Illustrative examples of fiber chemistries from which the inorganic fiber may be prepared include:

about 18 weight percent calcia, about 72 weight percent alumina, and about 10 weight percent potassia;

about 27 weight percent calcia, about 63 weight percent alumina, and about 10 weight percent potassia;

about 36 weight percent calcia, about 54 weight percent alumina, and about 10 weight percent potassia;

about 45 weight percent calcia, about 45 weight percent alumina, and about 10 weight percent potassia; and According to certain embodiments, the fiberization product of calcia, alumina, potassia and/or sodia comprises is prepared from greater than 60 weight percent alumina, contains 5 weight percent or less silica impurity, and exhibits a linear shrinkage of 10 percent or less after exposure to a temperature of 1260° C. for 24 hours.

The raw materials for the fiber melt may be obtained from any suitable source capable of supplying the required chemistry and purity. Without limitation, suitable sources of calcium oxide include calcium-aluminate cement having a desired ratio of $CaO/Al_2O_3$, lime, limestone, and quicklime. Without limitation, suitable sources of alumina are those having the required purity and which may be blended as needed with the CaO-bearing materials to achieve the desired chemistry.

In addition to calcia and alumina, the inorganic fiber may contain up to about 10 weight percent of impurities. Such impurities may include iron oxides. If iron oxide impurities are present in the fiberization melt from the starting raw materials, they are usually present in an amount of about 1 weight percent or less, calculated as $Fe_2O_3$.

The impurities in the inorganic fiber may include up to 10 percent by weight of silica impurity, based on the total weight of the fiber. However, in certain embodiments the fibers may contain less than about 4 weight percent silica, or even as low as about 2 weight percent silica or less.

Linear shrinkage of an inorganic fiber is a good measure of a fiber's high temperature resistance or of its performance at a particular continuous service or use temperature. The fibers exhibit a linear shrinkage after exposure to a service temperature of 1260° C. for 24 hours of 20 percent or less. Thus, the fibers are useful for thermal insulating applications at continuous service or operating temperatures of at least 1260° C. or greater. Furthermore, it has been found that the fibers do not melt until they are exposed to a temperature of 1400° C. or greater.

A method for preparing a high temperature resistant inorganic fiber that is non-durable in simulated physiological fluids and that exhibits low shrinkage is also provided. The method of forming the inorganic fiber includes forming a material melt of ingredients comprising calcia, alumina, potassia and optionally sodia, and forming fibers from the melt of ingredients. The inorganic fibers may be produced from the melt of ingredients by standard melt spinning or fiber blowing techniques. According to alternative embodiments, the method of forming the inorganic fiber includes forming a material melt of ingredients comprising calcia, alumina, potassia and optionally sodia, and boria and forming fibers from the melt of ingredients.

According to certain embodiments, the method of forming the inorganic fiber includes forming a material melt of ingredients comprising from about 10 weight percent to about 50 weight percent calcia, from about 50 weight percent to about 90 weight percent alumina, and up to about 10 weight percent of potassia and optionally sodia, and forming fibers from the melt of ingredients.

According to other embodiments, the method of forming the inorganic fiber includes forming a material melt of ingredients comprising from about 20 weight percent to about 50 weight percent calcia, from about 50 weight percent to about 80 weight percent alumina, and potassia and optionally sodia.

According to other embodiments, the method of forming the inorganic fiber includes forming a material melt of ingredients comprising from about 30 weight percent to about 50 weight percent calcia, from about 50 weight percent to about 70 weight percent alumina, and potassia and optionally sodia.

According to other embodiments, the method of forming the inorganic fiber includes forming a material melt of ingredients comprising from about 40 weight percent to about 50 weight percent calcia, from about 50 weight percent to about 60 weight percent alumina, and potassia and optionally sodia.

The viscosity of the material melt of ingredients may optionally be controlled by the presence of viscosity modifiers in an amount sufficient to provide the fiberization profile required for the desired applications. The viscosity modifiers may be present in the raw materials which supply the main components of the melt, or may, at least in part, be separately added. Desired particle size of the raw materials is determined by furnacing conditions, including furnace size, pour rate, melt temperature, residence time, and the like.

As described above, the inorganic fiber may be prepared by fiber blowing or fiber spinning techniques. A suitable fiber blowing technique includes the steps of mixing the starting raw materials containing calcia, alumina and potassia and optionally sodia together to form a material mixture of ingredients, introducing the material mixture of ingredients into a suitable vessel or container, melting the material mixture of ingredients for discharge through a suitable nozzle, and blowing a high pressure gas onto the discharged flow of molten material mixture of ingredients to form the inorganic fibers.

A suitable fiber spinning technique includes the steps of mixing the starting raw materials together to form a material mixture of ingredients, introducing the material mixture of ingredients into a suitable vessel or container, melting the material mixture of ingredients for discharge through a suitable nozzle onto spinning wheels. The molten stream then cascades over the wheels, coating the wheels and being thrown off through centripetal forces, thereby forming fibers which are collected on a suitable accumulator or collector.

A method of insulating an article using a thermal insulation material containing the inorganic fibers is also provided. The method of insulating an article includes disposing on, in, near, or around the article to be insulated, a thermal insulation material that is manufacture from a plurality of the inorganic fibers. The inorganic fibers included in the thermal insulation material are those comprising the fiberization product from about 10 weight percent to about 50 weight percent calcia, from about 50 weight percent to about 90 weight percent alumina, and up to about 10 weight percent of potassia and optionally sodia.

According to certain embodiments, the inorganic fibers included in the thermal insulation material are those fibers comprising from about 20 weight percent to about 50 weight percent calcia, from about 50 weight percent to about 80 weight percent alumina, and potassia and optionally sodia.

According to certain embodiments, the inorganic fibers included in the thermal insulation material are those fibers comprising from about 30 weight percent to about 50 weight percent calcia, from about 50 weight percent to about 70 weight percent alumina, and potassia and optionally sodia.

According to certain embodiments, the inorganic fibers included in the thermal insulation material are those fibers comprising from about 40 weight percent to about 50 weight percent calcia, from about 50 weight percent to about 60 weight percent alumina, and potassia and optionally sodia.

Thermal insulation containing the inorganic fibers may be utilized in thermal insulation applications as a replacement for standard mineral wool or refractory ceramic fiber. Thermal insulation material containing the inorganic fibers may be utilized for thermal insulation applications that require resistance of 1100° C. or greater. Moreover, thermal insulation material containing the inorganic fibers may be utilized for thermal insulation applications that require resistance of 1260° C. or greater. Without limitation, thermal insulation containing the inorganic fibers may be utilized to thermally insulate heating vessels, such as furnaces, in the chemical processing, petroleum processing, ceramic processing, glass processing, metals production and processing industries, or in the automotive, aerospace, appliance, and fire protection industries.

The inorganic fibers may be provided in the form of bulk fibers. Additionally, the inorganic fibers may be incorporated into a wide variety of acoustical, electrical, or thermal insulation articles or products. Without limitation, for example, the inorganic fibers may be processed into high temperature resistant fiber containing blankets, including needled and stitched blankets, boards, braids, cloths, expanding papers, non-expanding papers, fabrics, felts, cast shapes, modules, bonded modules, mats, packings, ropes, tapes, sleeving, vacuum cast shapes, woven textiles, workable compositions, including high temperature resistant caulks, cements, coatings, mortars, pumpable compositions, putties, and moldable compositions.

EXAMPLES

The following examples are set forth to further describe certain properties of illustrative embodiments of the inorganic fibers. However, the examples should not be construed as limiting the fiber, the fiber containing articles, or the processes of making or using them as thermal insulation in any manner.

Exemplary inorganic fibers were fiberized from the melts of ingredients shown in Table I below:

TABLE I

| Sample | CaO | $Al_2O_3$ | $K_2O$ | $Na_2O$ | $SiO_2$ | Phosphate |
|---|---|---|---|---|---|---|
| 1 | 45 | 45 | 10 | 0 | 0 | NC |
| 2 | 45 | 45 | 0 | 10 | 0 | NC |
| 3 | 36 | 54 | 10 | 0 | 0 | NC |
| 4 | 27 | 63 | 10 | 0 | 0 | NC |
| 4a | 27 | 63 | 10 | 0 | 0 | NC |
| 5 | 22 | 68 | 10 | 0 | 0 | NC |
| 5a | 22 | 68 | 10 | 0 | 0 | NC |
| 6 | 20 | 70 | 10 | 0 | 0 | NC |
| 7 | 54 | 36 | 10 | 0 | 0 | NC |
| 8 | 36 | 54 | 0 | 10 | 0 | NC |
| 9 | 27 | 63 | 0 | 10 | 0 | NC |
| 10 | 20 | 65 | 15 | 0 | 0 | NC |
| 11 | 27 | 63 | 10 | 0 | 0 | NC |
| 12 | 45 | 45 | 10 | 0 | 0 | NC |
| 13 | 37.5 | 57.5 | 5 | 0 | 0 | NC |
| 14 | 32.5 | 62.5 | 5 | 0 | 0 | NC |
| 15 | 27.5 | 67.5 | 5 | 0 | 0 | NC |
| 16 | 42.5 | 52.5 | 5 | 0 | 0 | NC |
| 17 | 47.5 | 47.5 | 5 | 0 | 0 | NC |
| 18 | 27 | 63 | 5 | 5 | 0 | NC |
| 19 | 20 | 70 | 5 | 5 | 0 | NC |
| 20 | 27 | 63 | 10 | 0 | 0 | NC |
| 21 | 27 | 63 | 10 | 0 | 0 | BC |
| 22 | 22 | 68 | 10 | 0 | 0 | NC |
| 23 | 22 | 68 | 10 | 0 | 0 | BC |
| 24 | 36 | 54 | 10 | 0 | 0 | NC |
| 25 | 17.5 | 62.5 | 20 | 0 | 0 | NC |
| 26 | 25 | 55 | 20 | 0 | 0 | NC |
| 27 | 10 | 55 | 35 | 0 | 0 | NC |
| 28 | 27.5 | 67.5 | 5 | 0 | 0 | NC |
| 29 | 15 | 80 | 5 | 0 | 0 | NC |
| 30 | 32.5 | 62.5 | 5 | 0 | 0 | NC |
| 31 | 32.5 | 62.5 | 5 | 0 | 0 | BC |
| 32 | 31 | 64 | 5 | 0 | 0 | NC |
| 33 | 31 | 64 | 5 | 0 | 0 | BC |
| 34 | 31 | 64 | 5 | 0 | 0 | S |
| 35 | 32.5 | 62.5 | 5 | 0 | 0 | NC |
| 36 | 32.5 | 62.5 | 5 | 0 | 0 | S |
| 37 | 32.5 | 62.5 | 5 | 0 | 0 | BC |
| 38 | 34 | 61 | 5 | 0 | 0 | NC |
| 39 | 34 | 61 | 5 | 0 | 0 | S |
| 40 | 34 | 61 | 5 | 0 | 0 | BC |
| 41 | 35 | 62.5 | 2.5 | 0 | 0 | NC |
| 42 | 35 | 62.5 | 2.5 | 0 | 0 | S |
| 43 | 31 | 64 | 5 | 0 | 0 | NC |
| 44 | 31 | 64 | 5 | 0 | 0 | S |
| 45 | 32.5 | 62.5 | 2.5 | 2.5 | 0 | NC |
| 46 | 32.5 | 62.5 | 2.5 | 2.5 | 0 | S |
| 47 | 32.5 | 62.5 | 2.5 | 2.5 | 0 | BC |
| 48 | 32.5 | 62.5 | 0 | 2.5 | 2.5 | NC |
| 49 | 32.5 | 62.5 | 0 | 2.5 | 2.5 | S |
| 50 | 32.5 | 62.5 | 0 | 2.5 | 2.5 | BC |

TABLE I-continued

| Sample | CaO | Al₂O₃ | K₂O | Na₂O | SiO₂ | Phosphate |
|---|---|---|---|---|---|---|
| 51 | 32.5 | 62.5 | 0 | 5 | 0 | NC |
| 52 | 32.5 | 62.5 | 0 | 5 | 0 | S |
| 53 | 35 | 62.5 | 2.5 | 0 | 0 | NC |
| 54 | 29 | 62.5 | 8.5 | 0 | 0 | NC |
| 55 | 35 | 62.5 | 2.5 | 0 | 0 | BC |
| 56 | 29 | 62.5 | 8.5 | 0 | 0 | BC |

NC—no phosphate coating
BC—phosphate applied by blow coating
S—phosphate, spray applied The compositions of the fibers of Table I above as measured by x-ray fluorescence as shown in Table II below.

TABLE II

| Sample | CaO | Al₂O₃ | K₂O | Na₂O | P₂O5 | SiO₂ |
|---|---|---|---|---|---|---|
| 1 | 35.58 | 39.44 | 12.66 | 0.34 | 0.021 | 10.92 |
| 3 | 29.23 | 48.65 | 13.29 | 0.46 | 0.19 | 7.68 |
| 4 | 22.61 | 57.19 | 13.52 | 0.51 | 0.2 | 5.58 |
| 4a | 22.61 | 57.19 | 13.52 | 0.51 | 0.2 | 5.58 |
| 5 | 19.5 | 61.83 | 14.79 | 0.59 | 0.091 | 2.9 |
| 5a | 19.5 | 61.83 | 14.79 | 0.59 | 0.091 | 2.9 |
| 6 | 18.02 | 64.74 | 14.86 | 0.49 | 0.02 | 1.61 |
| 8 | 34.58 | 53.93 | 0.39 | 9.57 | | 0.88 |
| 9 | 27.29 | 61.59 | 0.052 | 9.99 | | 0.64 |
| 10 | 18.33 | 60.09 | 20.43 | 0.38 | 0.021 | 0.47 |
| 11 | 24.68 | 61.48 | 12.11 | 0.35 | 0.027 | 0.95 |
| 12 | 39.78 | 47.73 | 10.64 | 0.43 | 0.031 | 0.91 |
| 13 | 34.14 | 57.62 | 6.04 | 0.3 | 0.017 | 1.35 |
| 14 | 31.2 | 61.24 | 5.96 | 0.31 | 0.014 | 0.85 |
| 15 | 26.61 | 66.15 | 5.99 | 0.32 | 0.022 | 0.6 |
| 16 | 40.44 | 53.86 | 4.11 | 0.26 | 0.013 | 0.87 |
| 17 | 43.58 | 48.37 | 6.3 | 0.3 | 0.015 | 0.95 |
| 18 | 26.74 | 62.17 | 5.78 | 4.36 | 0.015 | 0.62 |
| 19 | 20.29 | 69.31 | 5.76 | 3.89 | 0.006 | 0.5 |
| 20 | 22.61 | 57.19 | 13.52 | 0.51 | 0.2 | 5.58 |
| 21 | 22.61 | 57.19 | 13.52 | 0.51 | 0.2 | 5.58 |
| 22 | 19.5 | 61.83 | 14.79 | 0.59 | 0.091 | 2.9 |
| 23 | 19.5 | 61.83 | 14.79 | 0.59 | 0.091 | 2.9 |
| 24 | 46.82 | 40.45 | 10.81 | 0.26 | | 1.08 |
| 25 | 16.5 | 58.66 | 23.53 | 0.41 | | 0.63 |
| 26 | 24.56 | 54.78 | 19.13 | 0.4 | | 0.74 |
| 27 | 10.68 | 57.43 | 29.61 | 0.6 | | 1.46 |
| 28 | 26.1 | 66.62 | 6.07 | 0.26 | | 0.62 |
| 29 | 14.34 | 79.07 | 5.47 | 0.32 | | 0.59 |
| 30 | 30.87 | 61.56 | 5.78 | 0.32 | | 0.84 |
| 31 | 30.87 | 61.56 | 5.78 | 0.32 | | 0.84 |
| 32 | 29.1 | 63.6 | 5.71 | 0.29 | | 0.87 |
| 33 | 29.1 | 63.6 | 5.71 | 0.29 | | 0.87 |
| 35 | 30.31 | 62.32 | 5.81 | 0.31 | | 0.88 |
| 36 | 30.31 | 62.32 | 5.81 | 0.31 | | 0.88 |
| 37 | 29.43 | 61.06 | 5.55 | 0.32 | 2.45 | 0.82 |
| 38 | 30.85 | 61.59 | 6.12 | 0.27 | | 0.77 |
| 39 | 30.85 | 61.59 | 6.12 | 0.27 | | 0.77 |
| 40 | 30.34 | 58.5 | 5.41 | 0.26 | 4.49 | 0.65 |
| 41 | 33.56 | 61.81 | 3.07 | 0.26 | | 0.79 |
| 42 | 33.56 | 61.81 | 3.07 | 0.26 | | 0.79 |
| 43 | 29.99 | 63.6 | 5.28 | 0.31 | | 0.79 |
| 44 | 29.99 | 63.6 | 5.28 | 0.31 | | 0.79 |
| 45 | 30.35 | 63.76 | 2.83 | 2.26 | | 0.78 |
| 46 | 30.35 | 63.76 | 2.83 | 2.26 | | 0.78 |
| 47 | 31.09 | 62.63 | 2.67 | 2.14 | 0.67 | 0.78 |
| 48 | 31.45 | 62.65 | 0.21 | 2.51 | | 2.53 |
| 49 | 31.45 | 62.65 | 0.21 | 2.51 | | 2.53 |
| 50 | 30.38 | 62.18 | 0.084 | 2.29 | 2.14 | 2.54 |
| 51 | 30.56 | 63.2 | 0.14 | 4.78 | | 0.98 |
| 52 | 29.38 | 61.02 | 0.053 | 4.26 | 4.06 | 0.87 |
| 53 | 32.67 | 61.513 | 2.936 | 0.456 | 0.002 | 2.426 |
| 54 | 26.08 | 62.293 | 9.294 | 0.46 | 0.342 | 1.53 |
| 55 | 32.28 | 59.142 | 2.937 | 0.142 | 3.003 | 2.496 |
| 56 | 25.713 | 61.021 | 9.282 | 0.422 | 2.054 | 1.508 |

The compositions of the fibers of Table I above exhibited the following shrinkage, dissolution rate and compression recovery set forth in Table III below:

TABLE III

| | | Shrinkage | | | | Comp. Recovery (to 50%) | |
|---|---|---|---|---|---|---|---|
| | | 1260° C. | 1400° C. | Dissolution Rate | | | |
| Sample | Melt Pt. | shrink | shrink | k (pH 7.5) | k (pH 4) | 1260° C. | 1400° C. |
| 1 | 1300 | 15.5 | melted | 489 | 13788 | 8 | — |
| 2 | 1320 | 5.8 | melted | 453 | 8127 | 9 | — |
| 3 | 1315 | 12 | melted | 232 | 10635 | 16 | — |
| 4 | 1460 | 11.4 | 47.5 | 27 | 8100 | 14 | 0 |
| 5 | 1450 | 8.6 | 37.1 | 271 | 6558 | 12 | 0 |
| 6 | 1450 | 6.4 | >13.2 | 28 | 6500 | 9 | 3 |
| 8 | 1320 | — | — | 96 | 3703 | — | — |
| 9 | 1440 | — | — | 96 | 3206 | — | — |
| 10 | >1500° | 7.4 | 36.8 | 20 | 6800 | 11 | 0 |
| 11 | 1460 | 8.8 | 24.7 | 26 | 8400 | 18 | 0 |
| 12 | 1340 | 9.7 | melted | 636 | 10777 | 17 | — |
| 13 | 1312 | 13.9 | 49.2 | 208 | 8381 | 10 | 0 |
| 14 | 1320 | 8.4 | 22.4 | 132 | 7676 | 16 | 0 |
| 15 | 1445 | 7.8 | 26.1 | 125 | 3159 | 8 | 0 |
| 16 | 1315 | 41.1 | — | 163 | 11113 | — | — |
| 17 | 1340 | 16.9 | melted | 280 | 11414 | 8 | — |
| 18 | 1420 | 7.3 | 40.4 | 121 | 9577 | 14 | 0 |
| 19 | 1435 | 9 | 35.9 | 99 | 3923 | 11 | 0 |
| 20 | — | 6.8 | — | — | — | — | — |
| 21 | — | 5.5 | — | — | — | — | — |
| 23 | — | 9.1 | — | — | — | — | — |
| 23 | — | 6.1 | — | — | — | — | — |
| 24 | 1340 | 3.4 | melted | 472 | 10690 | 9 | — |
| 25 | 1355 | 6.4 | 16.7 | 769 | 7799 | 2 | 2 |
| 26 | 1320 | 5.6 | >18.7 | 1236 | 6422 | 4 | — |
| 27 | 1360 | — | — | 2239 | 6767 | — | — |
| 28 | 1450 | 10.3 | 20.3 | 106 | 2326 | 4 | 2 |
| 29 | >1500° | — | — | 96 | 646 | — | — |

TABLE III-continued

| Sample | Melt Pt. | Shrinkage 1260° C. shrink | Shrinkage 1400° C. shrink | Dissolution Rate k (pH 7.5) | Dissolution Rate k (pH 4) | Comp. Recovery (to 50%) 1260° C. | Comp. Recovery (to 50%) 1400° C. |
|---|---|---|---|---|---|---|---|
| 30 | 1445 | — | — | 122 | 8556 | — | — |
| 31 | — | 2.05 | — | — | — | — | — |
| 32 | 1448 | 8.48 | — | 133 | 8248 | — | — |
| 33 | — | 1.27 | — | — | — | 8.1 | — |
| 35 | 1450 | 8.9 | — | 148 | 8942 | — | — |
| 36 | — | 1.9 | 4.5 | — | — | 8.24 | 0 |
| 37 | 1430 | 3.8 | 11.1 | 106 | 11917 | 8.95 | 0 |
| 38 | 1435 | — | — | 151 | 8234 | — | — |
| 39 | — | 2.8 | 3.1 | — | — | 6.82 | 0 |
| 40 | 1437 | 3.8 | 10 | 98 | 7915 | 2.54 | 0 |
| 41 | 1365 | — | — | 139 | 176 | — | — |
| 42 | — | 2.2 | 3.9 | — | — | 7.45 | 0 |
| 43 | 1450 | — | — | 127 | 203 | — | — |
| 44 | — | 1.8 | — | — | — | 5.8 | — |
| 45 | 1395 | 10.9 | 30.1 | 128 | 19623 | — | — |
| 46 | — | 2.3 | 6.7 | — | — | 6.82 | — |
| 47 | 1390 | 4.9 | 11.8 | 101 | 22587 | 7.1 | — |
| 48 | 1370 | — | — | 81 | 8353 | — | — |
| 49 | — | 3.5 | — | — | — | 5.29 | — |
| 50 | 1460 | 3.1 | — | 75 | 8496 | 3.7 | — |
| 51 | 1440 | — | — | 102 | 6735 | — | — |
| 52 | >1500 | — | — | 74 | 1491 | — | — |

FIG. 1 is a graph which illustrates the percent shrinkage of calcia, alumina, alkali metal oxide fibers in relation to varying amounts of silica and alumina. All samples illustrated in FIG. 1 were uncoated. Samples comprising greater than 10 weight percent silica and less than 50 weight percent alumina generally exhibited a high shrinkage. Also, samples comprising from about 48 to about 56 weight percent alumina also generally exhibited a high shrinkage.

Figure 2:
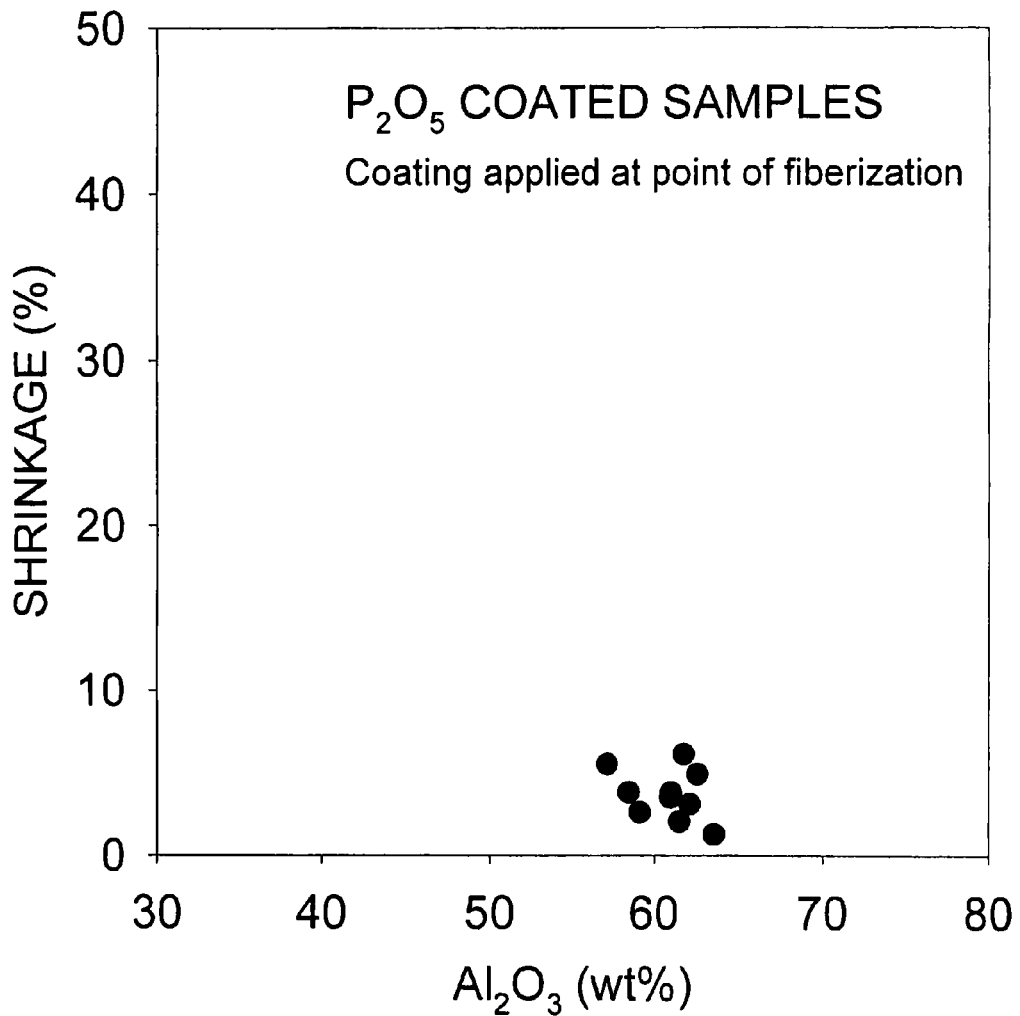
FIG. 2 is a graph showing the percent shrinkage of calcia, alumina, alkali metal oxide fibers coated with phosphorous pentoxide in relation to varying amounts of alumina.

FIG. 2 is a graph which illustrates the percent shrinkage of calcia, alumina, alkali metal oxide fibers coated with phosphorous pentoxide in relation to varying amounts of alumina. The samples were coated at the point of fiberization. As illustrated in the graph, the phosphorous pentoxide coating resulted in a general improvement in the shrinkage of the high alumina containing fibers.

Figure 3:
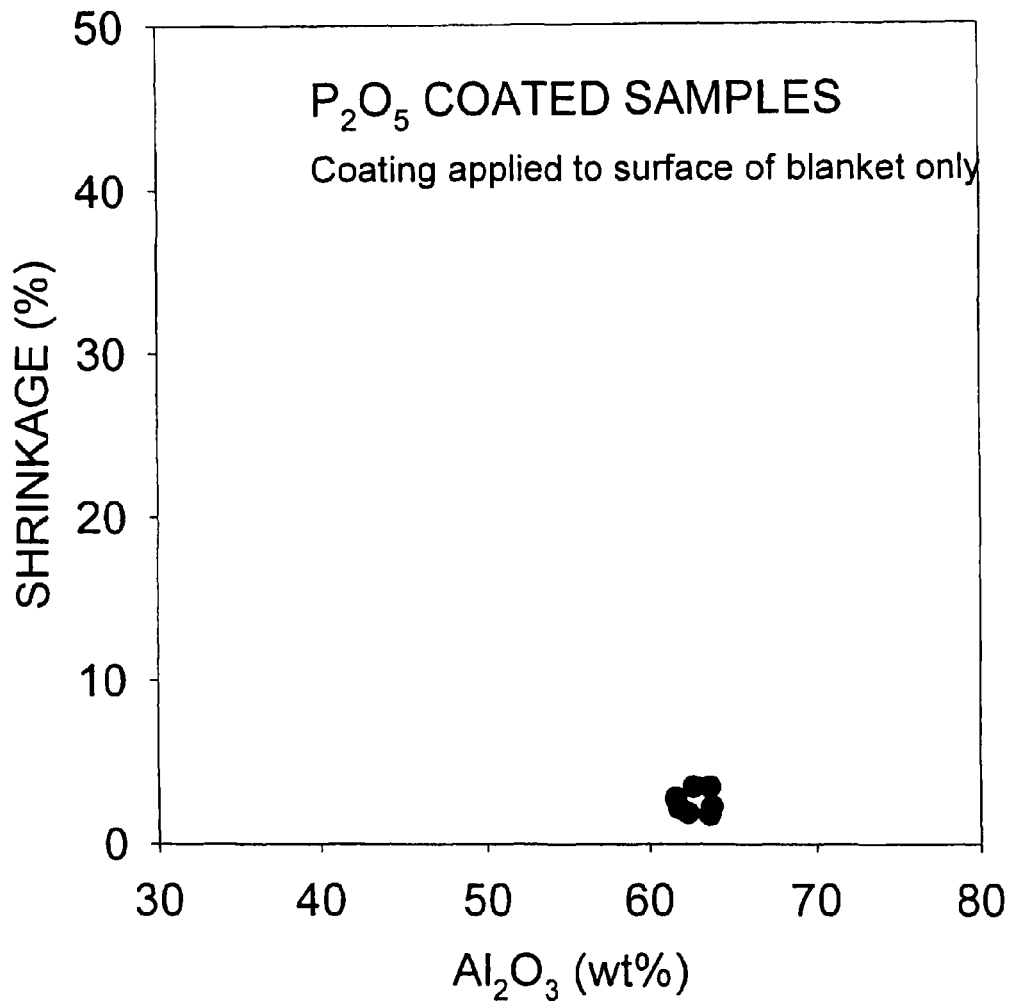
FIG. 3 is a graph showing the percent shrinkage of calcia, alumina, alkali metal oxide fiber blankets coated with phosphorous pentoxide in relation to varying amounts of alumina.

FIG. 3 is a graph which illustrates the percent shrinkage of calcia, alumina, alkali metal oxide fiber blankets coated with phosphorous pentoxide in relation to varying amounts of alumina. The samples were coated on the surface of the blanket only. As illustrated in the graph, the phosphorous pentoxide coating resulted in a general improvement in the shrinkage of the high alumina containing fibers.

Figure 4:
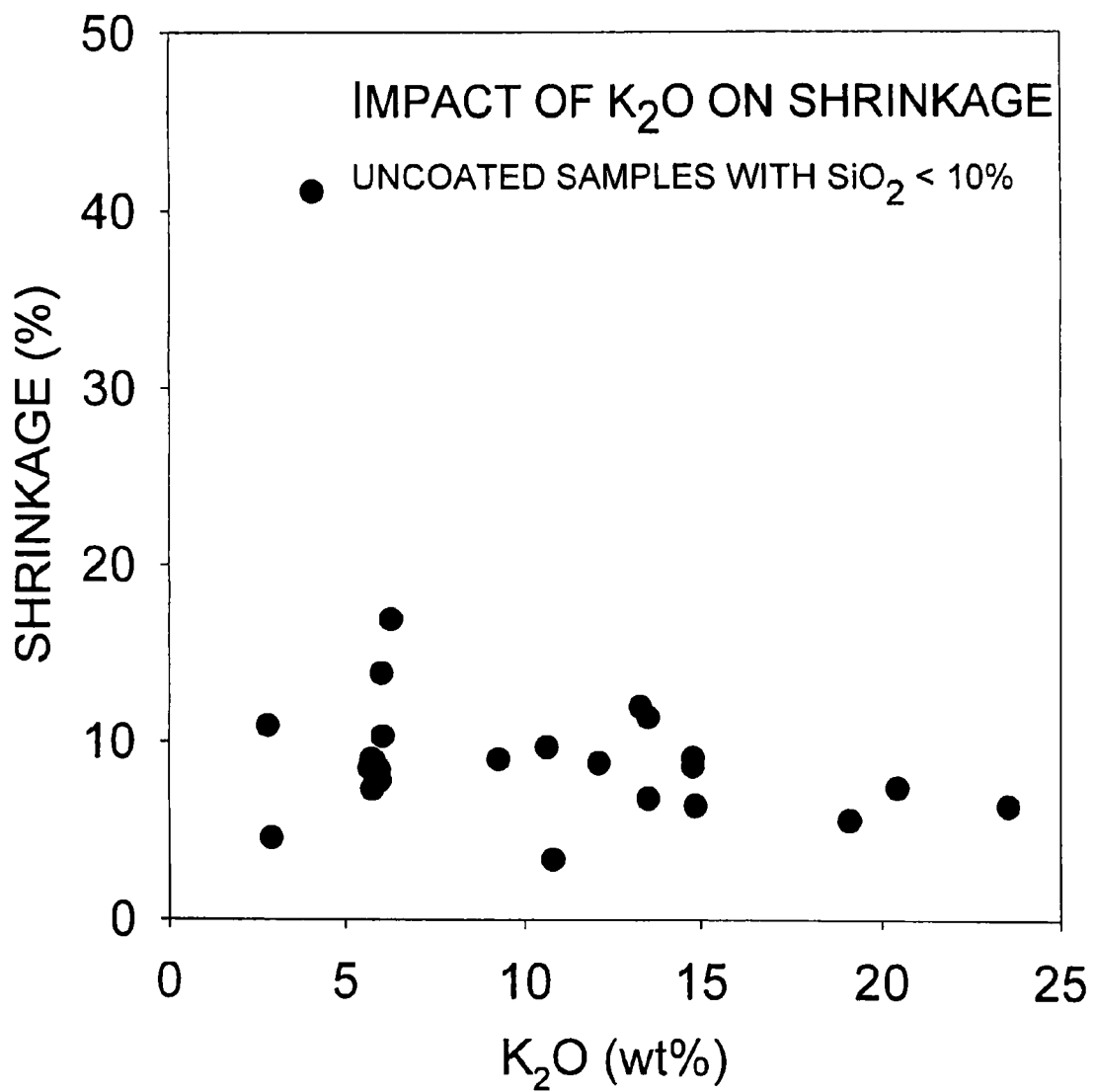
FIG. 4 is a graph showing the percent shrinkage of uncoated calcia, alumina, alkali metal oxide fibers comprising varying amounts of potassia and relatively low amounts of silica.

FIG. 4 is a graph illustrating the percent shrinkage of uncoated calcia, alumina, alkali metal oxide fibers comprising varying amounts of potassia and relatively low amounts of silica. As illustrated in FIG. 4, increasing the amount of potassia within uncoated samples comprising less than 10 weight percent silica generally had no effect on shrinkage performance.

Figure 5:
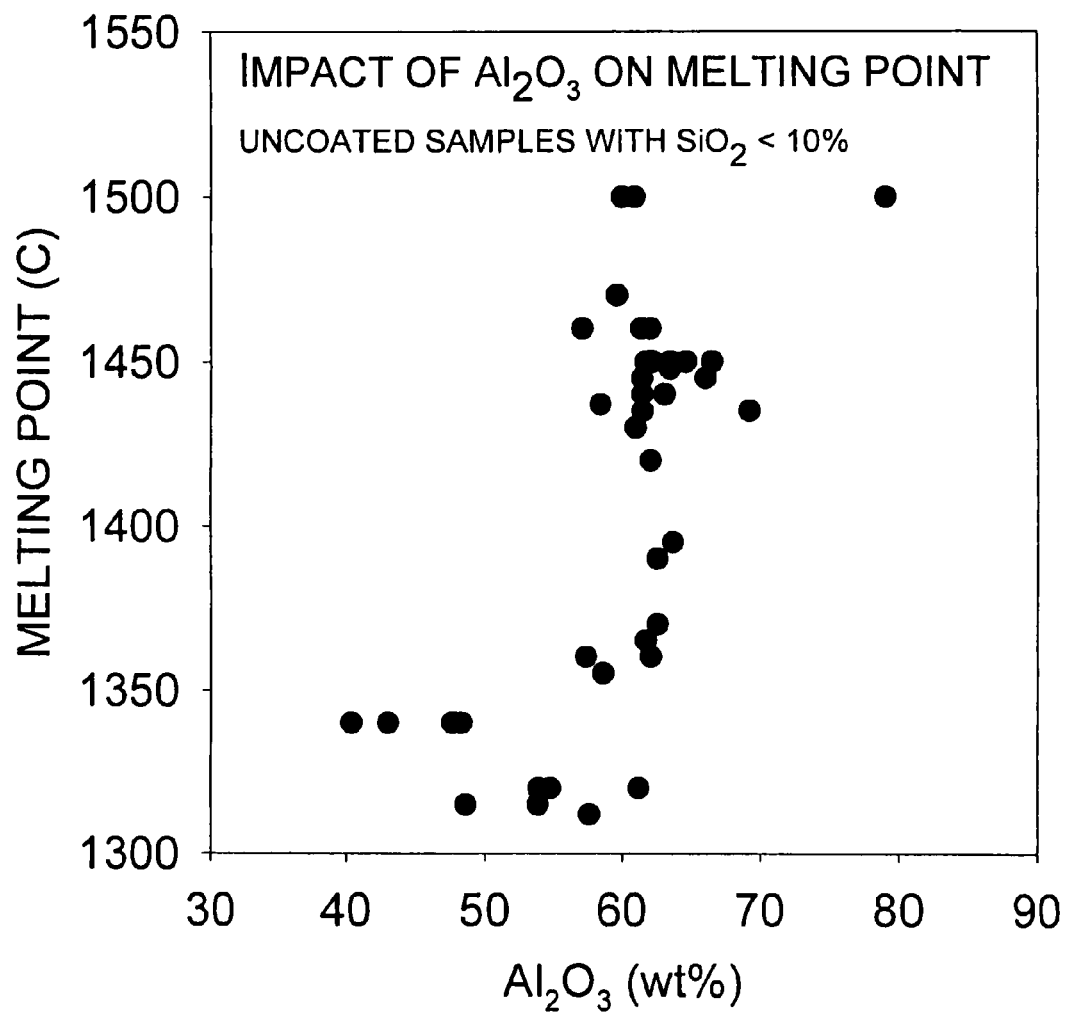
FIG. 5 is a graph showing the melting point of uncoated calcia, alumina, alkali metal oxide fibers comprising varying amounts of alumina and relatively low amounts of silica.

FIG. 5 is a graph illustrating the melting point of uncoated calcia, alumina, alkali metal oxide fibers comprising varying amounts of alumina and relatively low amounts of silica. As illustrated in FIG. 5, increasing the amount of alumina within uncoated samples comprising less than 10 weight percent silica generally increased the melting point of the inorganic fiber composition.

Fluxes, such as sodia and potassia, react with traditional alumino-silicate refractory ceramic fiber insulation materials melting the insulation and comprising the insulating capability of the refractory ceramic fiber insulation. Insulation materials prepared from the presently disclosed inorganic fiber is resistant to flux typically encountered in industrial furnaces.

While the inorganic fiber compositions, method for producing the inorganic fiber composition, the various inorganic fiber containing articles, and method of insulating articles have been described above in connection with certain illustrative embodiments, it is to be understood that other similar embodiments may be used or modifications and additions may be made to the described embodiments for performing the same function without deviating therefrom. Further, all embodiments disclosed are not necessarily in the alternative, as various embodiments may be combined or subtracted to provide the desired characteristics. Variations can be made by one having ordinary skill in the art without departing from the spirit and scope hereof. Therefore, the inorganic fiber compositions, method for producing the inorganic fiber composition, the various inorganic fiber containing articles, and method of insulating articles should not be limited to any single embodiment, but rather construed in breadth and scope in accordance with the recitations of the attached claims.

We claim:

1. An inorganic fiber comprising the fiberization product of (i) from about 10 weight percent to less than 40 weight percent calcia, (ii) greater than 60 weight percent to about 90 weight percent alumina, and (iii) potassia, and/or sodia, wherein said fiber contains 15 weight percent or less silica.

2. The inorganic fiber of claim 1, comprising the fiberization product of (i) from about 20 weight percent to less than 40 weight percent calcia, (ii) greater than 60 weight percent to about 80 weight percent alumina, and (iii) potassia and/or sodia.

3. The inorganic fiber of claim 2, comprising the fiberization product of (i) from about 30 weight percent to less than 40 weight percent calcia, (ii) greater than 60 weight percent to about 70 weight percent alumina, and (iii) potassia and/or sodia.

4. The inorganic fiber of claim 1, comprising the fiberization product of (i) from about 10 weight percent to less than 40 weight percent calcia, (ii) greater than 60 weight percent to about 90 weight percent alumina, and (iii) greater than 0 to 20 weight percent of potassia and/or sodia.

5. The inorganic fiber of claim 4, comprising the fiberization product of (i) from about 10 weight percent to less than 40 weight percent calcia, (ii) greater than 60 weight percent to about 90 weight percent alumina, and (iii) greater than 0 to 20 weight percent of potassia.

6. The inorganic fiber of claim 5, containing about 10 weight percent or less silica.

7. The inorganic fiber of claim 6, containing about 5 weight percent or less silica.

8. The inorganic fiber of claim 7, containing about 2 weight percent or less silica.

9. An inorganic fiber containing thermal insulation article comprising at least one of bulk fiber, blankets, needled blankets, papers, felts, cast shapes, vacuum cast forms, or compositions, wherein said inorganic fiber containing article comprises the inorganic fiber of claim 6.

10. The inorganic fiber of claim 1, containing about 1 weight percent or less iron oxide, calculated as $Fe_2O_3$.

11. The inorganic fiber of claim 1, having a continuous use temperature of at least 1100° C.

12. The inorganic fiber of claim 1, having a continuous use temperature of at least 1260° C.

13. The inorganic fiber of claim 1, having a continuous use temperature of at least 1330° C.

14. A method for producing an inorganic fiber comprising:
forming a melt with ingredients comprising (i) from about 10 to less than 40 weight percent calcia, (ii) greater than 60 to about 90 weight percent alumina, and (iii) potassia and/or sodia, and 15 weight percent or less silica; and
producing fibers from the melt.

15. The method of claim 14, wherein the melt of ingredients comprises (i) from about 20 weight percent to less than 40 weight percent calcia, (ii) greater than 60 weight percent to about 80 weight percent alumina, and (iii) potassia and/or sodia.

16. The method of claim 15, wherein the melt of ingredients comprises (i) from about 30 weight percent to less than 40 weight percent calcia, (ii) greater than 60 weight percent to about 70 weight percent alumina, and (iii) potassia and/or sodia.

17. The method of claim 14, wherein the melt of ingredients comprises (i) from about 10 weight percent to less than 40 weight percent calcia, (ii) greater than 60 weight percent to about 90 weight percent alumina, and (iii) greater than 0 to 20 weight percent of potassia and/or sodia.

18. The method of claim 17, wherein the melt of ingredients comprises (i) from about 10 weight percent to less than 40 weight percent calcia, (ii) greater than 60 weight percent to about 90 weight percent alumina, and (iii) greater than 0 to 20 weight percent of potassia and/or sodia, and about 10 weight percent or less silica.

19. The method of claim 18, wherein the melt comprises potassia.

20. The method of claim 14, wherein said producing the fibers from the melt comprises one of (i) spinning the fibers from the melt or (ii) blowing the fibers from the melt.

21. A method of insulating an article comprising disposing on, in, near or around the article, a thermal insulation material comprising inorganic fibers comprising a fiberization product of (i) from about 10 to less than 40 weight percent calcia, (ii) greater than 60 to about 90 weight percent alumina, and (iii) potassia and/or sodia and 15 weight percent or less silica.

22. The inorganic fiber of claim 21, comprising the fiberization product of (i) from about 10 weight percent to less than 40 weight percent calcia, (ii) greater than 60 weight percent to about 90 weight percent alumina, and (iii) greater that 0 to 20 weight percent of potassia and/or sodia.

23. The inorganic fiber of claim 22, comprising the fiberization product of (i) from about 10 weight percent to less than 40 weight percent calcia, (ii) greater than 60 weight percent to about 90 weight percent alumina, and (iii) greater than 0 to 20 weight percent of potassia and/or sodia, and about 10 weight percent or less silica.

24. The method of claim 23, wherein the fiberization product comprises boria.

25. A non-biopersistant inorganic fiber having a continuous use temperature of at least 1260° C. consisting essentially of the fiberization product of (i) from about 10 weight percent to less than 40 weight percent calcia, (ii) greater than 60 weight percent to about 90 weight percent alumina, (iii) potassia, and/or sodia, and (iv) 15 weight percent or less silica.

26. The inorganic fiber of claim 25, consisting essentially of the fiberization product of (i) from about 20 weight percent to less than 40 weight percent calcia, (ii) from about 50 weight percent to about 80 weight percent alumina, (iii) potassia and/or sodia, and (iv) 15 weight percent or less silica.

27. The inorganic fiber of claim 26, consisting essentially of the fiberization product of (i) from about 30 weight percent to less than 40 weight percent calcia, (ii) from about 50 weight percent to about 70 weight percent alumina, (iii) potassia and/or sodia, and (iv) 15 weight percent or less silica.

28. The inorganic fiber of claim 27, consisting essentially of the fiberization product of (i) about 40 weight percent calcia, (ii) from about 50 weight percent to about 60 weight percent alumina, (iii) potassia and/or sodia, and (iv) 15 weight percent or less silica.

29. The inorganic fiber of claim 25, consisting essentially of the fiberization product of (i) from about 10 weight percent to less than 40 weight percent calcia, (ii) from about 60 weight percent to about 90 weight percent alumina, (iii) greater than 0 to 20 weight percent of potassia and/or sodia, and (iv) 15 weight percent or less silica.

30. The inorganic fiber of claim 29, consisting essentially of the fiberization product of (i) from about 10 weight percent to less than 40 weight percent calcia, (ii) from about 60 weight percent to about 90 weight percent alumina, (iii) greater than 0 to 20 weight percent of potassia, and (iv) 15 weight percent or less silica.

31. The inorganic fiber of claim 30, containing about 10 weight percent or less silica.

32. The inorganic fiber of claim 31, containing about 5 weight percent or less silica.

33. The inorganic fiber of claim 32, containing about 2 weight percent or less silica.

34. The inorganic fiber of claim 25, wherein said fiber has a phosphorous pentoxide coating.

35. The inorganic fiber of claim 25, wherein said fiber exhibits a linear shrinkage of 20 percent or less after exposure to 1260° C. for 24 hours.

36. The inorganic fiber of claim 25, wherein said fiber exhibits a compressive recovery of at least 10 percent after exposure to 1260° C. for 24 hours.

* * * * *